United States Patent [19]

Wood et al.

[11] Patent Number: 4,941,099

[45] Date of Patent: Jul. 10, 1990

[54] ELECTRONIC ADHESION ADAPTIVE WHEEL SLIDE PROTECTION ARRANGEMENT FUNCTION

[75] Inventors: James A. Wood, Spartanburg; Richard J. Mazur, Greer, both of S.C.

[73] Assignee: American Standard Inc., Spartanburg, S.C.

[21] Appl. No.: 194,249

[22] Filed: May 16, 1988

[51] Int. Cl.$^5$ .............................. B60T 8/72; B60T 8/80; B60T 8/86

[52] U.S. Cl. ............................... 364/426.02; 303/104; 303/107

[58] Field of Search ........... 364/426.1, 426.02, 426.03, 364/426.05; 303/97, 99, 100, 103, 104, 107, 110

[56] References Cited

U.S. PATENT DOCUMENTS

| | | | |
|---|---|---|---|
| 3,398,994 | 8/1968 | Smith | 303/104 |
| 3,951,466 | 4/1976 | Guagliumi et al. | 303/103 |
| 3,953,083 | 4/1976 | Latvala et al. | 303/103 |
| 4,410,947 | 10/1983 | Strong et al. | 364/426.03 |
| 4,491,920 | 1/1985 | Wood et al. | 303/103 |
| 4,665,490 | 5/1987 | Masaki et al. | 364/426.02 |
| 4,701,682 | 10/1987 | Hirotsu et al. | 364/426.03 |
| 4,755,945 | 7/1988 | Kade et al. | 364/426.02 |
| 4,783,127 | 11/1988 | Kade et al. | 303/104 |

Primary Examiner—Felix D. Gruber
Attorney, Agent, or Firm—J. B. Sotak

[57] ABSTRACT

An electronic slip control system for railway vehicle brakes having a standard slip control logic circuit responsive to axle speed and rate signals to produce a multi-bit binary number word. A primary slip control word formation circuit for converting the multi-bit binary number word to a hexidecimal number word which is conveyed to a primary slip control table. The primary slip control table circuit conveys the hexidecimal number word to a table output selection circuit. A synchronous slip control logic circuit responsive to the axle speed and rate signals to produce a multi-bit binary word. A synchronous slip control word formation circuit for converting the multi-bit binary number word to a hexidecimal number word which is conveyed to a synchronous slip control table circuit. The synchronous slip control table circuit conveys the hexidecimal number word to the table output selection circuit which causes intermediate circuit means to convey an appropriate control signal to a brake valve for preventing wheel lockup.

36 Claims, 6 Drawing Sheets

ELECTRONIC ADHESION ADAPTIVE WHEEL SLIDE PROTECTION ARRANGEMENT FUNCTION

FIELD OF THE INVENTION

This invention relates to an electronic wheel slip slide brake control system, and more particularly to a microprocessor-based control system which can detect and correct slides in braking of a multiple truck transit or railway vehicle while optimizing the use of available adhesion and maximizing the prevention of wheel damage or flatting.

BACKGROUND OF THE INVENTION

It has been found that, when the brakes of a transit vehicle or railway train are applied, a braking force must be properly controlled in order to safely and efficiently slow down and/or stop the vehicle or train at a station or the like. For a given running surface condition, the force between the wheel tread and the running surface increases which intensifies the slip value toward a critical wheel slip value. When the value of the wheel slip increases beyond the critical slip value, the force between the wheel tread and running surface decreases. It will be appreciated that stable and effective braking occurs when the slip value is equal to or less than the critical slip value. Thus, when the slip value becomes greater than the critical slip value, the braking becomes unstable and results in a sudden wheel lockup which can increase the actual stopping distance. Accordingly, in the braking operation, it is advantageous to detect an incipient wheel lockup by continuously monitoring the wheel slip value between the wheel tread and the running surface in order to achieve the maximum possible braking effort.

A prior art wheel-slip control system is shown and disclosed in our U.S. Pat. No. 4,491,920, issued on Jan. 1, 1985, entitled "Rate Polarity Shift Wheel-Slip Control System," which is assigned to the assignee of this invention and which is incorporated by reference to the present application. Briefly, the wheel-slip control system is for a multiple-truck vehicle including a speed sensor for generating signals representative of the velocity of each of the wheel axle units. A differentiator is connected to each of the speed sensors for differentiating the velocity signals to obtain rate signals. A rate-determining circuit determines the most negative-going rate signal of each of the wheel axle unit of each truck. A plurality of deceleration threshold and rate direction detectors and data processing logic initiate a brake force reduction action on the truck experiencing a wheel slip, and a positive logic "OR" gate senses a polarity shift in the most negative rate signal to cause the data processing logic to reapply a braking action.

OBJECTS AND SUMMARY OF THE INVENTION

Accordingly, it is an object of this invention to provide a new and improved wheel slide control system.

A further object of this invention is to provide a unique wheel slide detection and correction arrangement which optimizes the use of available adhesion and maximizes wheel protection.

Another object of this invention is to provide an improved wheel slip control unit in which the control logic maximizes the use of available processing time to allow an appropriate amount of time available for diagnostics.

Yet a further object of this invention is to provide a unique vehicle wheel control system which eliminates the need of automatic wheel size normalization.

Yet another object of this invention is to provide a wheel control system which performs synchronous slip detection and correction without knowledge of the registered brake level.

Still a further object of this invention is to provide a vehicle wheel slip control arrangement in which the primary data used to perform the required logic inputs is derived from the axle speed and the axle rate signals.

Still another object of the invention is to provide a wheel slip control unit in which the necessary logic inputs are to be formed for each of the individual axles of the vehicle.

In addition, it is an object of this invention to provide a process by which a microprocessor-based wheel slide control device can detect and correct slides in braking by utilizing the combination of four separate forms of axle rate based detection, axle rate feedback control during correction and rate polarity shift wheel slip control for determining wheel slide correction.

Additionally, an object of this invention is to provide a vehicle wheel slide control system which is independent on wheel size normalization or calibration and which uses four separate rate based forms of slide detection to establish a detection net for effectively detecting every type of slide at all encountered adhesion levels.

Furthermore, it is an object of this invention to provide an electronic slip control system for a multiple-truck railway vehicle comprising a standard slip control logic means responsive to axle speed and rate signals to produce a multi-bit binary number word, a primary slip control word formation means for converting the multi-bit binary number word to a hexidecimal number word which is conveyed to a primary slip control table means, the primary slip control table means conveys the hexidecimal number word to a table output selection means, a synchronous slip control logic means responsive to the axle speed and rate signals to produce a multi-bit binary word, a synchronous slip control word formation means for converting the multi-bit binary number word to a hexidecimal number word which is conveyed to a synchronous slip control table means, the synchronous slip control table means conveys the hexidecimal number word to the table output selection means which causes intermediate circuit means to convey an appropriate control signal to a brake valve for preventing wheel lockup.

DESCRIPTION OF THE DRAWINGS

The above objects and other features and advantages of the present invention will become more readily apparent when combined in conjunction with the detailed description and the accompanying drawings wherein:

FIGS. 1, 2, and 3 illustrate a schematic circuit block diagram which, when placed in side-by-side relationship, namely, when FIG. 1 is disposed to the left, FIG. 2 is situated in the center, and FIG. 3 is disposed to the right of a wheel-slip brake control system for one axle of the truck in accordance with the present invention.

FIGS. 4, 5 and 6 illustrate a schematic circuit block diagram which, when place in side-by-side relationship, namely, when FIG. 4 is disposed to the left, FIG. 5 is situated in the center and FIG. 6 is disposed to the right

DETAILED DESCRIPTION OF THE INVENTION

Figure 1:
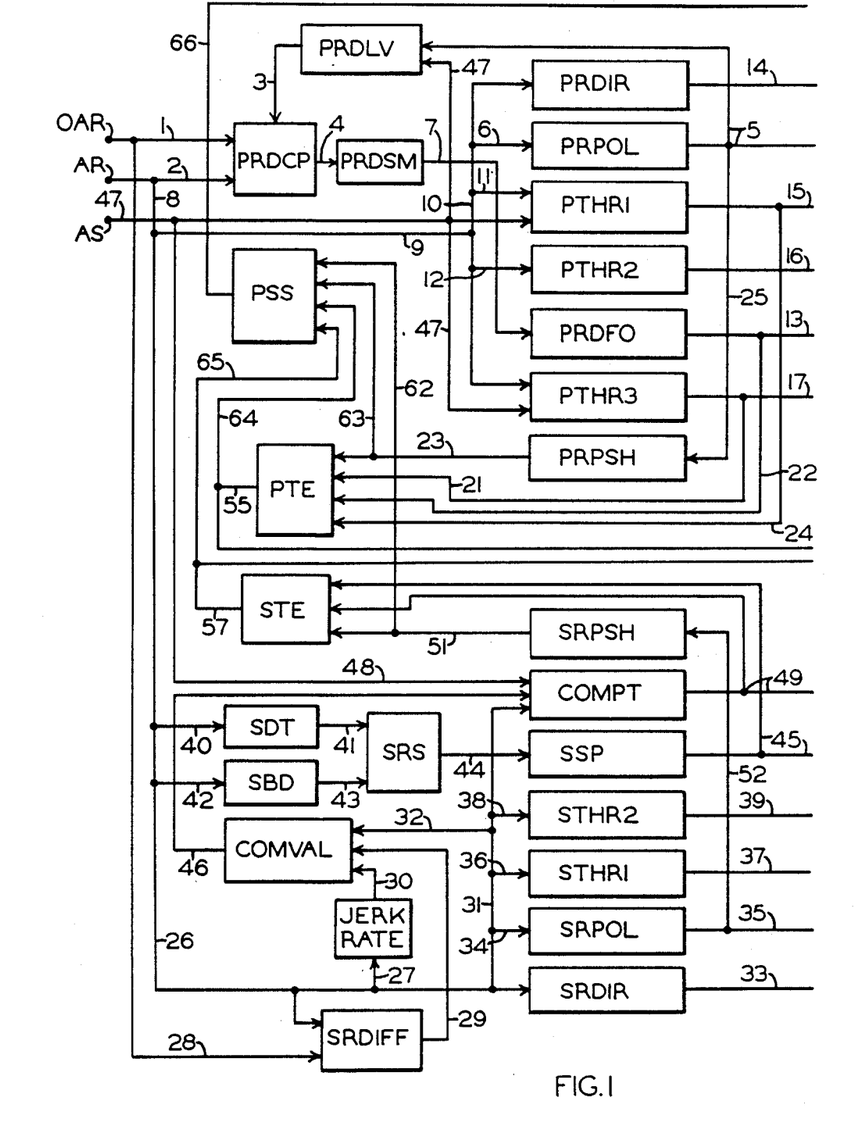

Referring now to the drawings, and in particular to FIG. 1, there is shown a pair of input terminals OAR and AR which receive the axle rate signals from the one or outboard axle and the other or inboard axle of one of the two given trucks of the railway vehicle. A further input terminal AS receives an axle speed signal of the given truck of the railway vehicle. The rate and speed signals may be generated in a manner similar to that shown and disclosed in the previously noted U.S. Pat. No. 4,491,920. The following is a discussion of the standard slip control logic inputs. The rate signals appearing on terminals OAR and AR are conveyed to the two inputs of a primary rate difference comparison circuit PRDCP via leads 1 and 2, respectively.

The comparator PRDCP includes a logic sensor which compares the one axle rate AR with the other axle rate OAR on the truck. The comparison is made by subtracting the other axle rate OAR from the axle rate AR, namely, AR-OAR. If AR-OAR is less than the input supplied via lead 3 from the primary rate differential level circuit PRDLV, then the output on lead 4 of the comparator sensor PRDCP will be a logical "1." If the AR-OAR is greater than the input on lead 3, then the output on lead 4 of the comparator sensor PRDCP will be a logical "0." The primary rate differential level circuit PRDLV includes a logic sensor which determines the rate difference detection level based on the primary rate polarity circuit PRPOL.

The primary rate polarity circuit PRPOL includes a logic sensor which indicates that the axle rate of an axle has a positive polarity. The polarity sensor produces a logical "1" on output lead 5 if the axle rate is a positive polarity and produces a logical "0" on lead 5 if the axle rate is a negative polarity. The polarity sensor has a hysteresis band. The axle rate must be at least +1.4 to +2.4 miles per hour per second (mphps) to change from a negative to a positive and must be at least −0.2 mphps to +0.4 mphps to change from a positive to a negative. This hysteresis band is set dependent on the inertia characteristics of the vehicle on which this device is used. If the input on lead 6 of the level sensor PRPOL is a logical "1," the output on lead 5 will be −1.5 mphps plus the maximum vehicle request rate level. For example, the output on lead 5 in one case would be −1.5 mphps to −2.5 mphps which is equal to −4.0 mphps. In another case, the output on lead 5 may be −1.5 mphps+−3.2 mphps which is equal to −4.7 mphps. If the polarity sensor PRPOL supplies a logical "0" to the input of level sensor PRDLV the output will be at a speed determined set point. Normally, the axle speed of the outboard or outer axle of the trucks of the vehicle is used and the set point variation is controlled in accordance with a look-up table. If for any reasons the axle speed of the outboard axle is lost due to a malfunction, then the axle speed of the inboard or inner axle is used.

The following table is a listing of the set point variation with respect to speed:

| Vehicle Speed | PRDLV Set Point | |
|---|---|---|
| | Case No. 1 | Case No. 2 |
| <16 mph | −2 mphps | −2 mphps |
| 16–32 mph | −2 mphps | −3 mphps |
| 32–48 mph | −3 mphps | −4 mphps |
| 48–64 mph | −3 mphps | −5 mphps |
| 64–80 mph | −3 mphps | −6 mphps |
| 80–96 mph | −4 mphps | −8 mphps |
| 96–112 mph | −4 mphps | −8 mphps |
| >112 mph | −4 mphps | −8 mphps |

It will be seen that the primary rate difference summing sensor PRDSM has a single input which is connected via lead 4 to the output of the comparison sensor PRDCP. The summing sensor PRDSM has an output which is equal to S1+S2+S3+S4+S5. The initial input from comparison sensor PRDCP is in S1 while the former value of S1 is placed in S2. The former value of S2 is placed in S3 while the former value S3 is placed in S4. The former value of S4 is placed in S5 while the former value of S5 is discarded. The summing sensor PRDSM is dependent on a 20 millisecond (ms) program cycle time which may be established by a suitable internal clock or the like.

The output of the summing sensor PRDSM is connected to the input of a primary rate difference final output sensor PRDFO via lead 7. If the input value from the summing sensor PRDSM is equal to 5, the output on lead 13 of the final output sensor PRDFO will be a logical "1" and if it is not 5 the output will be a logical "0."

It will be seen that the axle rate signals AR appearing on lead 2 are conveyed to the input of a primary rate direction logic sensor PRDIR via leads 8, 9, and 10. The rate direction sensor PRDIR determines whether the rate is increasing or decreasing without regard as to whether it is positive or negative. In practice, the sensor PRDIR defines an increasing rate as being more positive and a decreasing rate as being more negative. It will be appreciated that the rate direction is essential in determining jerk rate $D_{(rate)}/dt$ polarity. An increasing rate sets the output on lead 14 of sensor PRDIR to a logical "1" while a decreasing rate or a stationary rate, namely, a rate which is neither increasing nor decreasing sets the sensor PRDIR to a logic "0."

It will be noted that the rate signals appearing on terminal AR are conveyed to the input of a first primary threshold logic sensor PTHR1 via leads 2, 8, 9, 10 and 11. The logic sensor PTHR1 determines whether the axle rate is greater than or equal to a set point. It will be understood that positive numbers are assumed to be greater than negative numbers even when the numerical value of the negative number is larger than the positive number. If the axle rate is greater than or equal to a specified set point, the output on lead 15 of the sensor PTHR1 is a logical "1," and if the axle rate is less than the set point the output of the sensor PTHR1 is a logical "0." It will be appreciated that the set point will vary in accordance with the speed of the axle. As previously noted, the outboard or outer axle of each truck of the vehicle will normally be used except when the axle speed of the outboard axle is lost due to a malfunction in which case the speed of the inboard or inner axle will be used. The various values of the set points are a function of the speed and are readily determined from the following look-up table:

| Vehicle Speed | PTHR1 Set Point |
| --- | --- |
| <16 mph | −1 mphps |
| 16–32 mph | −6 mphps |
| 32–48 mph | −6 mphps |
| 48–64 mph | −6 mphps |
| 64–80 mph | −6 mphps |
| 80–96 mph | −6 mphps |
| 96–112 mph | −6 mphps |
| >112 mph | −6 mphps |

It will be understood these values are purposely set high and may be changed during dynamic testing. Also the set point value of the sensor PTHR1 must, at all times, be greater than the set point value for another primary threshold sensor PTHR3 which will be described hereinafter.

Further, it will be seen that rate signals appearing on input terminal AR are fed to the input of a second threshold logic sensor PTHR2 via leads 2, 8, 9, 10 and 12. The logic sensor PTHR2 determines if the axle rate is greater than or equal to a positive rate set point. Again, it should be understood that the rate signal of the axle must be greater than or equal to the set point for the sensor PTHR2 to produce an output which is representative of a logical "1" on lead 16 and if the axle rate is less than the positive rate set point the output on the sensor PTHR2 will be equivalent to a logical "0." For the purpose of testing, the set point arranged to be at +20 mphps. After testing, the set point was fixed at +6 mphps.

In addition, it will be observed that the rate signals appearing on terminal AR connected to the input of a third primary threshold logic sensor PTHR3 via leads 2, 8, 9, and 10. The logic sensor PTHR3 determines if the axle rate is less than or equal to the negative rate set point, and if this is the case, the sensor PTHR3 produces an output on lead 17 which signifies a logical "1." If the axle rate is greater than the negative rate set point, the sensor PTHR3 produces an output which is equivalent to a logical "0." It is quite apparent that the set point will vary in accordance with the speed of the axle. As previously pointed out, the axle speed of the outboard or outer axle of the trucks of the vehicle is normally used; however, if the axle speed of the outboard axle is lost due to a malfunction, then the axle speed of the inboard or inner axle of the truck is used. The following table gives the set point variation at different speeds.

| | PRTHR3 Set Point | |
| --- | --- | --- |
| Vehicle Speed | Case No. 1 | Case No. 2 |
| <16 mph | −7 mphps | SAME |
| 16–32 mph | −8 mphps | " |
| 32–48 mph | −10 mphps | " |
| 48–64 mph | −11 mphps | " |
| 64–80 mph | −12 mphps | " |
| 80–96 mph | −12 mphps | " |
| 96–112 mph | −12 mphps | " |
| >112 mph | −12 mphps | " |

Figure 3:
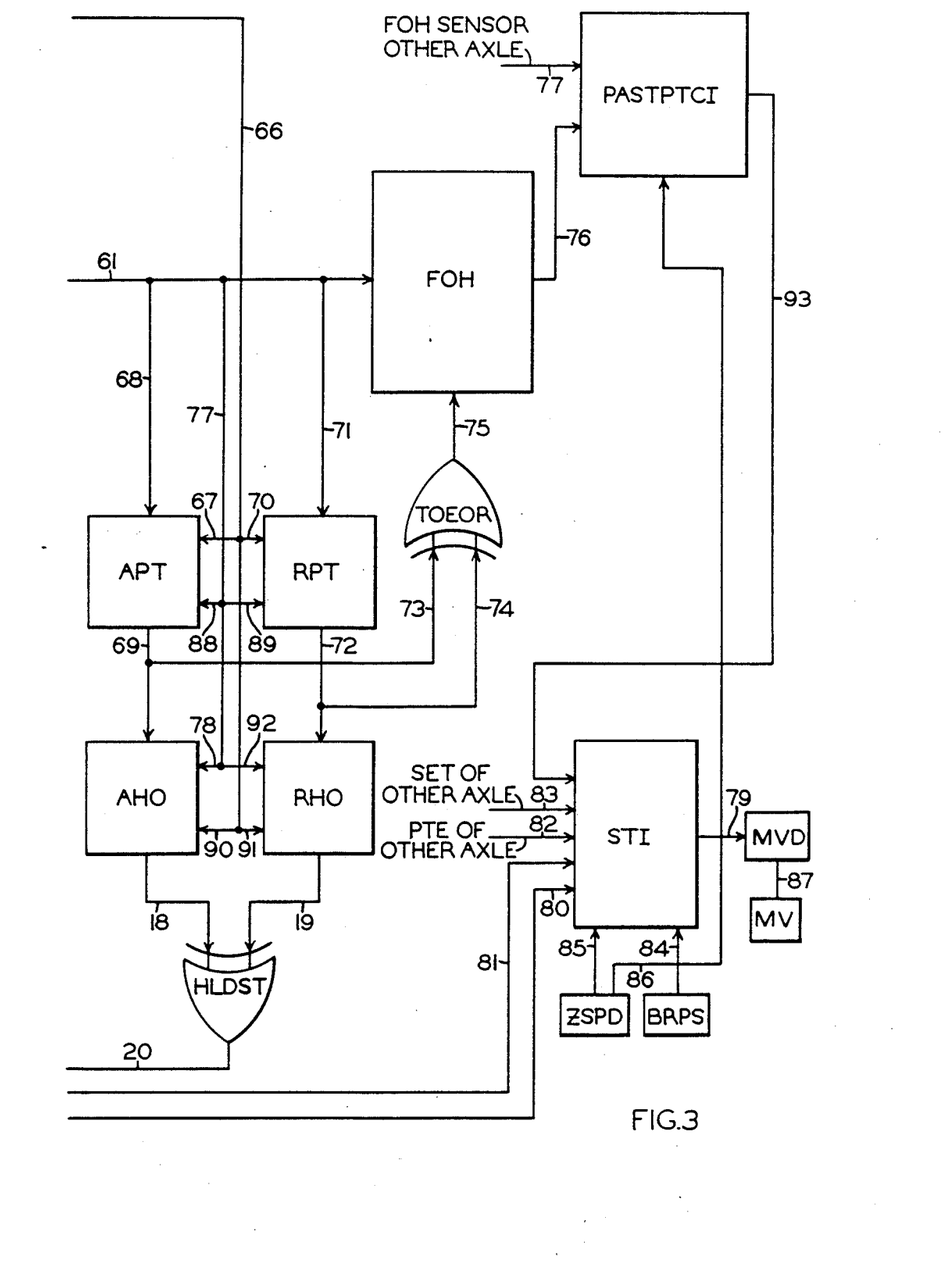

Referring now to FIG. 3, it will be seen that a hold state logic sensor HLDST informs the primary slip control table, which will be set forth hereinafter, that a release or application brake force pulse is in effect and that a hold state table output will be in effect until the pulse duration has expired. A release pulse is made up of a predetermined time period brake force release which is followed by a predetermined time period brake force hold state. Likewise, an application pulse is made up of a predetermined time period brake force application which is followed by a predetermined time period brake force hold state. The sensor HLDST takes the form of a two exclusive "OR" gate which produces a logical "1" output to indicate a release or application pulse is in effect and which produces a logical "0" output to signify that there is no release or application pulse in effect. The one input lead 18 is connected to an application hold one-shot circuit AHO while the other input lead 19 is connected to a release hold one-shot circuit RHO which will be described hereinafter. If the hold state logic sensor HLDST receives a logical "1" either from the application hold one-shot AHO or from the release hold one-shot RHO but not both of the one-shots then the logic sensor HLDST will produce a logical "1" on output lead 20. Otherwise, the sensor HLDST will produce a logical "0" on lead 20.

Referring again to FIG. 1, it will be observed that primary table enable/disable circuit PTE has the function to determine whether a primary control table will be accessed or not. The enable/disable circuit PTE is enabled by a logical "1" on lead 21 which is connected to the third primary hold sensor PTHR3 or by a logical "1" on lead 22 which is connected to the primary rate difference final output sensor PRDFO. It will be understood that there are two ways of disabling the enable/disable circuit PTE. The first was to disable the enable/disable circuit PTE is to produce a logical "1" on lead 23 which is connected to the primary rate polarity shift sensor PRPSH. The second way to disable the enable/disable circuit PTE is to provide a suitable built-in timer, which begins to count when the table is enabled, reaches 2 seconds and the first primary threshold sensor PTHR1 produces a logical "1" on lead 24. It will be appreciated that, if the timer reaches 3 seconds and the first primary threshold sensor PTHR1 produces a logical "0" on lead 24, the primary table will remain enabled until the first primary threshold sensor PTHR1 produces a logical "1" on lead 24. It will be understood that the time period is dependent upon rotational mass of the vehicle so that a vehicle having a greater rotation mass will require a longer time period.

The primary rate polarity shift sensor PRPSH sends out a signal for a one program cycle whenever the primary rate polarity sensor PRPOL changes from a state where the axle rate is positive to a state where the axle rate goes to a negative polarity. When the primary rate polarity sensor changes its state on lead 25 from a logical "1" output to a logical "0" output the primary rate polarity shift sensor PRPSH will produce a logical "1" output on lead 23 for one program cycle. Otherwise, the primary rate polarity shift sensor PRPSH will remain in a state in which a logical "0" will be developed on lead 23.

The following is a discussion of the synchronous slip control logic inputs which is shown in FIG. 1. The rate signal of each axle of the truck is capable of forming two other distinct signals. The first signal is derived from the jerk rate circuit which is connected to terminal AR via leads 26 and 27. The jerk rate signal is $D_{(average\ rate)}/dt$. The jerk rate signal is developed by the previous 20 ms rate minus the present rate. The second signal is the difference between the one axle rate on a truck and the other axle rate on the same truck. The second signal is not developed if the other axle rate is greater than or equal to zero. The actual signal is formed by subtracting the inboard axle rate from the outboard axle rate. As shown in FIG. 1, the AR and OAR terminals are connected via leads 26 and 28, respectively, to circuit SRDIFF to produce the differential signal on lead 29. The jerk rate signal is conveyed to a combined value sensor COMVAL via lead 30, and the SRDIFF signal is conveyed to the COMVAL circuit via lead 29, while the axle rate signal is conveyed to the COMVAL circuit via leads 2, 8, 26, 31 and 32. Thus, the COMVAL signal is a combination of the rate, jerk rate and SRDIFF signals. In practice, the COMVAL signal is the summation of the absolute value of the rate, the absolute value of the jerk rate, and the absolute value of the SRDIFF signals.

Each of the following logic inputs will be common to each individual axle on the vehicle. As shown, a synchronous rate direction logic sensor SRDIR is connected to terminal AR via leads 2, 8, and 26. The synchronous rate direction logic sensor SRDIR is employed to determine whether the rate is increasing or decreasing without regard as whether the rate is positive or negative. In practice, it is considered that an increasing rate is a rate that is going positive while a decreasing rate is a rate that is going negative. The logic sensor SRDIR monitors the output of the one axle rate AR which corresponds to the jerk rate signal and if the jerk rate signal is positive a logical "1" will appear on output lead 33. If the jerk rate signal is negative or zero a logical "0" will appear on output lead 33.

It will be seen that synchronous rate polarity logic sensor SRPOL is connected to terminal AR via leads 2, 8, 26, 31 and 34. The logic sensor SRPOL indicates whether the axle rate of the axle is at a positive polarity. The output lead 35 of the logic sensor SRPOL will be at a logical "1" if the axle rate of the axle is at a positive polarity, and the output lead 35 will be at a logical "0" if the axle rate is at a negative polarity. The logic sensor SRPOL has a hysteresis band. The rate must be at +1.4 mphps to +3.4 mphps to change from negative to positive and must be at −0.2 mphps to +0.4 mphps to change from positive to negative.

It will be observed that a first synchronous threshold logic sensor STHR1 is connected to terminal AR via leads 2, 8, 26, 31 and 36. The logic sensor STHR1 determines if the axle average rate is less than the maximum vehicle request rate. The average rate of the axle is compared to a −4.0 mphps set point. If the axle has an average rate that is less than or equal to the −4.0 mphps set point, the logic sensor STHR1 will produce a logical "1" on the output lead 37, and if the axle has an average rate that is greater than the −4.0 mphps set point, the logic sensor STHR1 will produce a logical "0" on the output lead 37.

Now it will be noted that a second synchronous threshold logic sensor STHR2 is connected to terminal AR via leads 2, 8, 26, 31 and 38. The second logic sensor STHR2 determines if the axle rate is greater than or equal to a positive rate set point. The rate of the axle must be greater than or equal to the set point in order for the logic sensor STHR2 to produce a logical "1" on the output lead 39. If the axle rate is less than the positive set point, then the logic sensor STHR2 will produce a logical "0" on the output lead 39. The set point in normally established between +6.0 mphps and +8.0 mphps; however, the given value should be optimized for any particular application during dynamic testing.

It will be seen that a synchronous determination logic sensor SDT is connected to terminal AR via leads 2, 8, and 40. The logic sensor SDT is directly responsive to the axle rate and produces a hexidecimal number on output lead 41 as indicated in the following table:

| INPUT | OUTPUT |
| --- | --- |
| < −4 mphps | 00H |
| −4 to −5 mphps | 01H |
| −5 to −6 mphps | 02H |
| −6 to −7 mphps | 03H |
| −7 to −8 mphps | 04H |
| −8 to −9 mphps | 05H |
| −9 to −10 mphps | 06H |
| −10 to −11 mphps | 07H |
| −11 to −12 mphps | 08H |
| −12 to −13 mphps | 09H |
| <13 mphps | 00H |

As shown in FIG. 1, a synchronous band detection logic sensor SBD is connected to terminal AR via leads 2, 8, and 42. The logic sensor SBD is also directly responsive to the axle rate. If the axle rate is less than or equal to −4.0 mphps and greater than −13.0 mphps, the logic sensor SBD will produce a logical "1" on output lead 43. The logic sensor SBD will produce a logical "0" on output lead 43 if the axle rate is outside this range.

It will be observed that a synchronous rate summation logic sensor SRS receives its inputs for logic sensors SDT and SBD via leads 41 and 43, respectively. If the input on lead 43 is a logical "1," the hexidecimal input from the logic sensor is summed in the memory of the logic sensor SRS. After completion of the summing operation, the particular hexidecimal value in the memory of logic sensor SRS will be conveyed to output lead 44. If the input on lead 43 is a logical "0," the memory in logic sensor SRS will reset so that a hexidecimal value of 00H will appear on output lead 44. It will be appreciated that in all cases the output of the logic sensor SRS will be in hexidecimal form.

Next, it will be seen that a synchronous set point logic sensor SSP receives the hexidecimal output from the synchronous rate summation logic sensor SRS via lead 44. If the value of the hexidecimal input to logic sensor SSP from logic sensor SRS is greater than or equal to 32H, or alternatively 2BH, then the output lead 45 of logic sensor SSP will be a logical "1." If not, the output of the logic sensor SSP will be a logical "0."

As shown, a third threshold detection logic sensor COMPT has three inputs, one of which is connected to the output of the logic sensor COMVAL via lead 46. The second input to the logic sensor COMPT is connected to terminal AR via leads 2, 8, 26, and 31. The third input to the logic sensor COMPT is connected to terminal AS via leads 47 and 48. The function of the logic sensor COMPT is to determine if the axle rate is greater than or equal to a COMVAL set point. If the COMVAL signal of the axle is greater than or equal to the COMVAL set point and the output of the synchronous threshold logic sensor STHR1 is at a logical "1" then the logic sensor COMPT will produce a logical "1" on output lead 49. If the COMVAL signal of the axle is less than the COMVAL set point, the logic sensor COMPT produces a logical "0" on output lead 49. It will be appreciated that the COMVAL set point may be a variable which is dependent upon the speed of the vehicle. If the set point varies with axle speed, the speed of the outboard axle will be used, and the set point variation will be controlled by a look-up table. In case the outboard axle speed is lost due to a malfunction, the speed of the inboard axle will be used.

Figure 2:
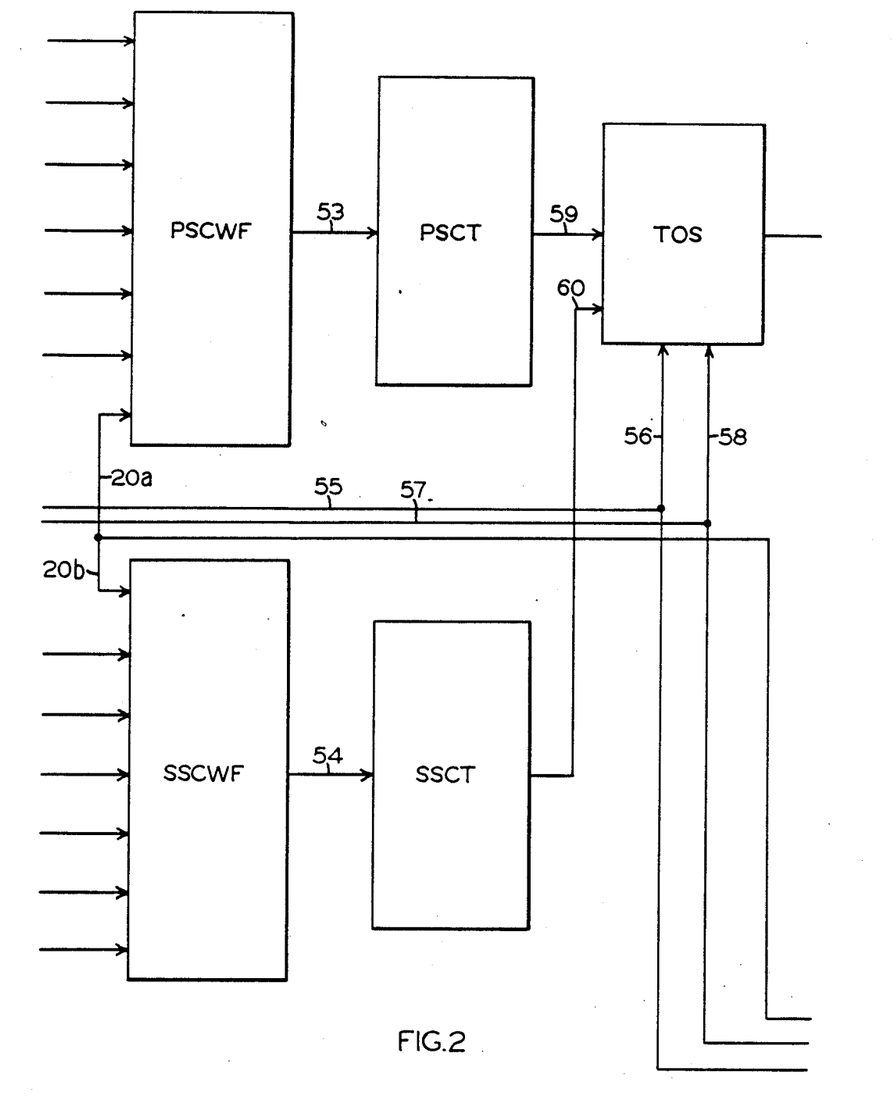

The hold state logic sensor HLDST informs the synchronous slip control table SSCT (FIG. 2) in the same manner as the logic sensor HLDST informed the primary slip control table PSCT (FIG. 2).

It will be seen that a synchronous table enable/disable circuit STE determines whether the synchronous slip control table SSCT (FIG. 2) is to be assessed or not. This function does not form a part of the synchronous wheel slip control word. This function is enabled by a logical "1" on output lead 46 of the COMVAL circuit via the threshold detection logic sensor COMPT or by a logical "1" output lead 45 of the synchronous set point sensor SSP. It will be appreciated that this function can be disabled in two ways. The first way is by providing a logical "1" on the output lead 51 of a synchronous rate polarity shift sensor SRPSH which will be described hereinafter. The second way to disable the synchronous slip control table SSCT (FIG. 2) is by a suitable built-in timer which begins counting when the table is enabled, reaches 3.5 seconds.

In viewing FIG. 1, it will be noted the synchronous rate polarity shift logic sensor SRPSH is connected via input lead 52 to the output lead 35 of the synchronous rate polarity sensor SRPOL. The logic sensor SRPSH emits a signal via lead 51 for one program cycle whenever the synchronous rate polarity sensor SRPOL changes from a state where the axle rate is positive to a state where the axle rate goes to a negative rate. That is, when the synchronous rate polarity sensor changes from a logical "1" on leads 35, 52 to a logical "0," the synchronous rate polarity shift sensor SRPSH will have a logical "1" on output lead 51 for one program cycle. Otherwise, the output lead 51 will be at a logical "0."

In viewing FIG. 3, it will be recognized that a safety timer interface circuit STI operates to nullify slip control on a per-truck basis during malfunctions which could cause excessive or extended release of the brake cylinder pressure. For example, if per-axle force modulation is employed, then this function is done on a per-axle basis. The safety timer is normally enabled by the primary table enable or the synchronous table enable of either one or both axles. The safety timer STI will reset before it times out by a condition when neither the primary table nor the synchronous table is enabled. If the set time period of the safety timer STI expires, the logic signal conveyed to the magnetic valve driver MVD will be an application command and the safety timer STI will only be reset by a zero speed signal from the zero speed circuit ZSPD or by a brake release signal received by the safety timer STI from the brake release pressure switch BRPS. If one or both of the primary table enable/disable circuit PTE produces a logical "1" output or one or both of the synchronous table enable/disable circuit STE produces a logical "1" output, the safety timer STI will begin its counting operation. If both outputs of the primary table enable/disable circuit PTE are a logical "0" or if both outputs of the synchronous table enable/circuit STE are a logical "0," the safety timer STI will be reset provided its count has not reached seven seconds. When the count reaches seven seconds, the safety timing circuit STI will cause an application command signal to be conveyed to the magnetic valve driver circuit MVD which can only be reset by a zero speed signal from the zero speed circuit ZSPD or a brake release command signal from the brake release pressure switch BRPS.

In describing the implementation of the control, it will be convenient to refer to FIGS. 1, 2, and 3. Both the primary slip control logic and synchronous slip control logic are employed to determine the optimum brake force modulation output for each axle by means of a look-up table. Each of the control logic processes takes the various inputs form the respective sensors and forms a seven-bit slip control word. The seven-bit slip control word forms the address for the particular slip control logic table for initiating the appropriate corresponding force modulation output.

The primary slip control word formation logic PSCWF uses the seven bits to form the primary slip control word. The seven bits are represented by the characters B0 to B6. The following is a list of the seven bits and sensors which form the word:

| Bit | Sensor |
|-----|--------|
| B0  | PRDIR  |
| B1  | PRPOL  |
| B2  | PTHR1  |
| B3  | PTHR2  |
| B4  | PRDFO  |
| B5  | PTHR3  |
| B6  | HLDST  |

The order of formation of the primary slip control word is B6 B5 B4 B3 B2 B1 B0 conveyed via lead 53.

This seven-bit binary number is converted to a split two-digit hexidecimal number which is conveyed via lead 53 for more readily displaying the document of the corresponding table. The brake force modulation output selection possibilities for the primary slip control table are as follows:

| Primary Slip control Table | | | | | | | |
|------|---------|------|---------|------|---------|------|---------|
| WORD | OUTPUT  | WORD | OUTPUT  | WORD | OUTPUT  | WORD | OUTPUT  |
| 00   | REL     | 20   | REL     | 40   | REL     | 60   | REL     |
| 01   | REL     | 21   | REL     | 41   | REL     | 61   | REL     |
| 02   | APP (F) | 22   | APP (F) | 42   | APP (F) | 62   | APP (F) |
| 03   | APP (F) | 23   | APP (F) | 43   | APP (F) | 63   | APP (F) |
| 04   | REL PLS | 24   | APP (F) | 44   | LAP     | 64   | APP (F) |
| 05   | LAP     | 25   | APP (F) | 45   | LAP     | 65   | APP (F) |
| 06   | LAP     | 26   | APP (F) | 46   | LAP     | 66   | APP (F) |
| 07   | LAP     | 27   | APP (F) | 47   | LAP     | 67   | APP (F) |
| 08   | APP (F) | 28   | APP (F) | 48   | APP (F) | 68   | APP (F) |
| 09   | APP (F) | 29   | APP (F) | 49   | APP (F) | 69   | APP (F) |
| 0A   | APP (F) | 2A   | APP (F) | 4A   | APP (F) | 6A   | APP (F) |
| 0B   | APP (F) | 2B   | APP (F) | 4B   | APP (F) | 6B   | APP (F) |
| 0C   | APP (F) | 2C   | APP (F) | 4C   | APP (F) | 6C   | APP (F) |
| 0D   | APP (F) | 2D   | APP (F) | 4D   | APP (F) | 6D   | APP (F) |
| 0E   | LAP     | 2E   | APP (F) | 4E   | LAP     | 6E   | APP (F) |
| 0F   | APP PLS | 2F   | APP (F) | 4F   | LAP     | 6F   | APP (F) |

-continued

| | | | Primary Slip control Table | | | | |
|---|---|---|---|---|---|---|---|
| WORD | OUTPUT | WORD | OUTPUT | WORD | OUTPUT | WORD | OUTPUT |
| 10 | REL | 30 | REL | 50 | REL | 70 | REL |
| 11 | REL | 31 | REL | 51 | REL | 71 | REL |
| 12 | APP (F) | 32 | APP (F) | 52 | APP (F) | 72 | APP (F) |
| 13 | APP (F) | 33 | APP (F) | 53 | APP (F) | 73 | APP (F) |
| 14 | REL PLS | 34 | APP (F) | 54 | LAP | 74 | APP (F) |
| 15 | LAP | 35 | APP (F) | 55 | LAP | 75 | APP (F) |
| 16 | LAP | 36 | APP (F) | 56 | LAP | 76 | APP (F) |
| 17 | LAP | 37 | APP (F) | 57 | LAP | 77 | APP (F) |
| 18 | APP (F) | 38 | APP (F) | 58 | APP (F) | 78 | APP (F) |
| 19 | APP (F) | 39 | APP (F) | 59 | APP (F) | 79 | APP (F) |
| 1A | APP (F) | 3A | APP (F) | 5A | APP (F) | 7A | APP (F) |
| 1B | APP (F) | 3B | APP (F) | 5B | APP (F) | 7B | APP (F) |
| 1C | APP (F) | 3C | APP (F) | 5C | APP (F) | 7C | APP (F) |
| 1D | APP (F) | 3D | APP (F) | 5D | APP (F) | 7D | APP (F) |
| 1E | APP PLS | 3E | APP (F) | 5E | LAP | 7E | APP (F) |
| 1F | LAP | 3F | APP (F) | 5F | LAP | 7F | APP (F) |

Wherein the parenthesized letter (F) denotes a physically impossible condition which therefore is inherently considered to be a logic processing fault or error.

The abbreviation APP represents the application of brakes, while the abbreviation REL represents the release of brakes. The abbreviation LAP imports a hold present brake force level. The abbreviation APP PLS signifies that the brake force is applied for a period of time T1 which is then followed by a LAP condition for a time period T2. The abbreviation REL PLS means the brake force is released for a period of time T3 which is then followed by a LAP condition for a time period T4. The abbreviation BF HOLD is indicative of a brake force modulation output and is read as LAP and all other logic input changes are ignored until the pulse is terminated.

The synchronous slip control word formation SSCWF also uses seven bits to form the synchronous slip control word. The seven bits are represented by the characters B0 to B6. The following is a list of the seven bits and sensors which form the word:

| Bit | Sensor |
|---|---|
| B0 | SRDIR |
| B1 | SRPOL |
| B2 | STHR1 |
| B3 | STHR2 |
| B4 | SSP |
| B5 | COMPT |
| B6 | HLDST |

The order of formation of the synchronous slip control word is B6 B5 B4 B3 B2 B1 B0.

This seven-bit binary number is also converted to a split two-digital hexidecimal number which is conveyed via lead 54 for more readily displaying the document of the corresponding table. The brake force modulation selection possibilities for the synchronous slip control table are as follows:

| | | | Synchronous Slip Control Table | | | | |
|---|---|---|---|---|---|---|---|
| WORD | OUTPUT | WORD | OUTPUT | WORD | OUTPUT | WORD | OUTPUT |
| 00 | REL PLS | 20 | APP (F) | 40 | REL LAP | 60 | APP (F) |
| 01 | LAP | 21 | APP (F) | 41 | LAP | 61 | APP (F) |
| 02 | LAP | 22 | APP (F) | 42 | LAP | 62 | APP (F) |
| 03 | LAP | 23 | APP (F) | 43 | LAP | 63 | APP (F) |
| 04 | REL PLS | 24 | REL PLS | 44 | LAP | 64 | LAP |
| 05 | REL PLS | 25 | REL PLS | 45 | LAP | 65 | LAP |
| 06 | APP (F) | 26 | APP (F) | 46 | APP (F) | 66 | APP (F) |
| 07 | APP (F) | 27 | APP (F) | 47 | APP (F) | 67 | APP (F) |
| 08 | APP (F) | 28 | APP (F) | 48 | APP (F) | 68 | APP (F) |
| 09 | APP (F) | 29 | APP (F) | 49 | APP (F) | 69 | APP (F) |
| 0A | LAP | 2A | APP (F) | 4A | LAP | 6A | APP (F) |
| 0B | APP PLS | 2B | APP (F) | 4B | LAP | 6B | APP (F) |
| 0C | APP (F) | 2C | APP (F) | 4C | APP (F) | 6C | APP (F) |
| 0D | APP (F) | 2D | APP (F) | 4D | APP (F) | 6D | APP (F) |
| 0E | APP (F) | 2E | APP (F) | 4E | APP (F) | 6E | APP (F) |
| 0F | APP (F) | 2F | APP (F) | 4F | APP (F) | 6F | APP (F) |
| 10 | APP (F) | 30 | APP (F) | 50 | APP (F) | 70 | APP (F) |
| 11 | APP (F) | 31 | APP (F) | 51 | APP (F) | 71 | APP (F) |
| 12 | APP (F) | 32 | APP (F) | 52 | APP (F) | 72 | APP (F) |
| 13 | APP (F) | 33 | APP (F) | 53 | APP (F) | 73 | APP (F) |
| 14 | REL PLS | 34 | REL PLS | 54 | LAP | 74 | LAP |
| 15 | REL PLS | 35 | REL PLS | 55 | LAP | 75 | LAP |
| 16 | APP (F) | 36 | APP (F) | 56 | APP (F) | 76 | APP (F) |
| 17 | APP (F) | 37 | APP (F) | 57 | APP (F) | 77 | APP (F) |
| 18 | APP (F) | 38 | APP (F) | 58 | APP (F) | 78 | APP (F) |
| 19 | APP (F) | 39 | APP (F) | 59 | APP (F) | 79 | APP (F) |
| 1A | APP (F) | 3A | APP (F) | 5A | APP (F) | 7A | APP (F) |
| 1B | APP (F) | 3B | APP (F) | 5B | APP (F) | 7B | APP (F) |
| 1C | APP (F) | 3C | APP (F) | 5C | APP (F) | 7C | APP (F) |
| 1D | APP (F) | 3D | APP (F) | 5D | APP (F) | 7D | APP (F) |
| 1E | APP (F) | 3E | APP (F) | 5E | APP (F) | 7E | APP (F) |

| | | | Synchronous Slip Control Table | | | | |
|---|---|---|---|---|---|---|---|
| WORD | OUTPUT | WORD | OUTPUT | WORD | OUTPUT | WORD | OUTPUT |
| 1F | APP (F) | 3F | APP (F) | 5F | APP (F) | 7F | APP (F) |

Again, the parenthesized letter (F) denotes a physically impossible condition which therefore is intrinsically considered to be a logic processing fault or error.

It will be understood that the abbreviations APP, LAP, APP PLS, REL PLS, and BF HOLD of the synchronous slip control table are the same as those of the primary slip control table. However, it will be noted that a direct release output is not a possibility for the synchronous slip control table.

In viewing FIG. 2, it will be seen that a table output selector TOS is connected to the primary and synchronous table enable/disable circuits PTE and STE via leads 55, 56, and 57, 58, respectively, and also to the primary and synchronous slip control tables PSCT and SSCT via leads 59 and 60, respectively. The following table illustrates the logical inputs from primary and synchronous table enable/disable circuits PTE and STE which result in the output selection on lead 61 of the output selector TOS:

| PTE Input | STE Input | TOS Output |
|---|---|---|
| 1 | 1 | Primary Slip Table Magnetic Valve Word |
| 1 | 0 | Primary Slip Table Magnetic Valve Word |
| 0 | 1 | Sync. Slip Table Magnetic Valve Word |
| 0 | 0 | Application Magnetic Valve Word |

As shown in FIG. 1, a polarity shift selector PSS has four inputs, one of which is connected to the output of the synchronous rate polarity shift sensor SRPSH via leads 51 and 62. The second input of the polarity shift selector PSS is connected to the output of the primary rate polarity shift sensor PRPSH via leads 23 and 63, while the third output of the polarity shift selector PSS is connected to the output of the primary table enable/disable circuit PTE via leads 55 and 64. The fourth input to the polarity shift selection PSS is connected to the output of the synchronous table enable/disable circuit STE via leads 57 and 65. The following table illustrates the outputs of the polarity shift selector PSS in response to the logical inputs from the primary and synchronous table enable/disable circuits PTE and STE, respectively:

| PTE Input | STE Input | PSS Output |
|---|---|---|
| 1 | 1 | Primary Rate Polarity Shift |
| 1 | 0 | Primary Rate Polarity Shift |
| 0 | 1 | Sync. Rate Polarity Shift |
| 0 | 0 | "0" |

Turning to FIG. 3, it will be seen that an application pulse timer APT is connected to the polarity shift selector PSS via leads 66 and 67. The application pulse timer APT reads or interrogates the output word from the table output selector TOS via leads 61 and 68. If an application pulse word is detected, the timer APT will produce a logical "1" on output lead 69 for a given time period, such as, 40 ms, after which it will reset to a logical "0." If timer APT receives a release word from the table output selector TOS or receives a logical "1," from the polarity shift selector PSS, via leads 66 and 67, the timer will immediately reset and produce a logical "0" on output lead 69. It will be appreciated that the time period may be changed or varied, depending upon the requirements of any particular installation.

Further, in viewing FIG. 3, it will be seen that a release pulse timer RPT is also connected to the polarity shift selector PSS via leads 66 and 70. The timer RPT reads and senses the output word from the table output selector TOS via leads 61 and 71. If a release pulse word is detected, the timer RPT will product a logical "1" on output lead 72 for a given time period, such as, 40 ms, after which it will reset to a logical "0." If the timer RPT receives a release word from the table output selector TOS on a logical "1" from the polarity shift selector PSS, the timer RPT will immediately reset and produce a logical "0" on output lead 72. It will be understood that the time period may be changed or varied, depending upon the requirements of any given application.

It will be noted that a two-input timer output exclusive "OR" gate TOEOR is connected to the application pulse timer APT via leads 69 and 73 and is connected to the release pulse timer RPT via leads 72 and 74. If the exclusive "OR" gate TOEOR senses a logical "1" on one but not both of its inputs from either the application pulse timer APT or the release pulse timer RPT, then the exclusive "OR" gate will produce a logical "1" on output lead 75. If a logical "1" or logical "0" appears on both inputs of the exclusive "OR" gate TOEOR, then a logical "1" will produce a logical "0" on output lead 75.

As shown in FIG. 3, a force output hold sensor FOH is connected to the table output selector TOS via lead 61 and to the exclusive "OR" gate via lead 75. If the output from the exclusive "OR" gate is a logical "1," the output on lead 76 of the force output hold sensor FOH is the same as the output on lead 61 of the table output selector TOS. So long as the exclusive "OR" gate produces a logical "1" on lead 75, the output on lead 76 of the force output hold sensor FOH will correspond to the output state of the table output selector at the time the exclusive "OR" gate became a logical "1."

In viewing FIG. 3, it will be observed than an application hold one-shot sensor AHO is connected to the application pulse timer APT via lead 69 and is connected to the table output sensor via leads 61, 77, and 78. The output on lead 18 of sensor AHO is a logical "0" except when the state of the application pulse timer APT changes from a logical "1" to a logical "0." When this transition occurs, the output on lead 18 of sensor AHO will go to a logical "1" for a predetermined time period such as 40 ms. When a release output word is received on leads 61, 77 and 78 from the table output selector TOS, or when a logical "1" is received on leads 66 and 90 for the polarity shift selector PSS, the sensor AHO will immediately reset and produce a logical "0"

on lead 18. It is quite apparent that the 40 ms time period may be changed if desired.

Further, a release hold one-shot sensor RHO is connected to the release pulse timer via lead 72 and is connected to the table output selector via leads 61, 77 and 92. Thus, the output signal on lead 19 of sensor RHO will be a logical "0" except when the electrical state of the release pulse timer RPT changes from a logical "1" to a logical "0." When this logical transition occurs, the output on lead 19 of sensor RHO will assume a logical "1" for a predetermined time period of approximately 40 ms after which the sensor RHO will reset to a logical "0". The reception of a release output word from the table output selector TOS or the appearance of a logical "1" on leads 66 and 91 from the polarity shift selector will cause the sensor RHO to immediately reset to a logical "0." Again, it will be understood that the 40 ms time period may be changed in accordance with the requirements of the particular installation and characteristics of the vehicle. As previously mentioned, the input leads 18 and 19 are connected to the hold state exclusive "OR" gate HLDST which produces a logical "1" on output lead 20 when either, but not both, the application hold one-shot AHO and the release hold one-shot RHO provide a logical "1" thereto.

Again, in viewing FIG. 3, it will be seen that the force output hold sensor FOH is connected to a per-axle sensing to per-truck control interface circuit past PASTPTCI via leads 76 and 77. The function of the interface circuit PASTPTCI is to take the output of the force output hold sensor FOH of each axle of the truck and to make an ongoing determination which as to which of the axle outputs will be utilized for the logic communication link to the per-truck dump valves. Thus, it will be noted that a per-axle dump valve arrangement is not necessary for the present interface. The two inputs to interface circuit PASTPTCI is from the respective axle force output hold sensors which take the form of a slip control table valve state command which is conveyed to the safety timer interface circuit STI via lead 93. As previously mentioned, the safety timer STI controls the magnetic valve driver MVD via lead 79 in accordance with the condition of the inputs on leads 80, 81, 82, and 83 which are connected to primary table enable/disable circuit PTE, the synchronous table enable/disable circuit STE, the other axle primary table enable/disable circuit PTE and the other axle synchronous table enable/disable circuit STE, respectively. In addition, the safety timer interface circuit has an input from the brake release pressure switch BRPS via lead 84 and an input from the zero speed sensor ZSPD via lead 85. The zero speed sensor ZSPD is also connected to the interface circuit PASTPTCI via lead 86.

Figure 4:
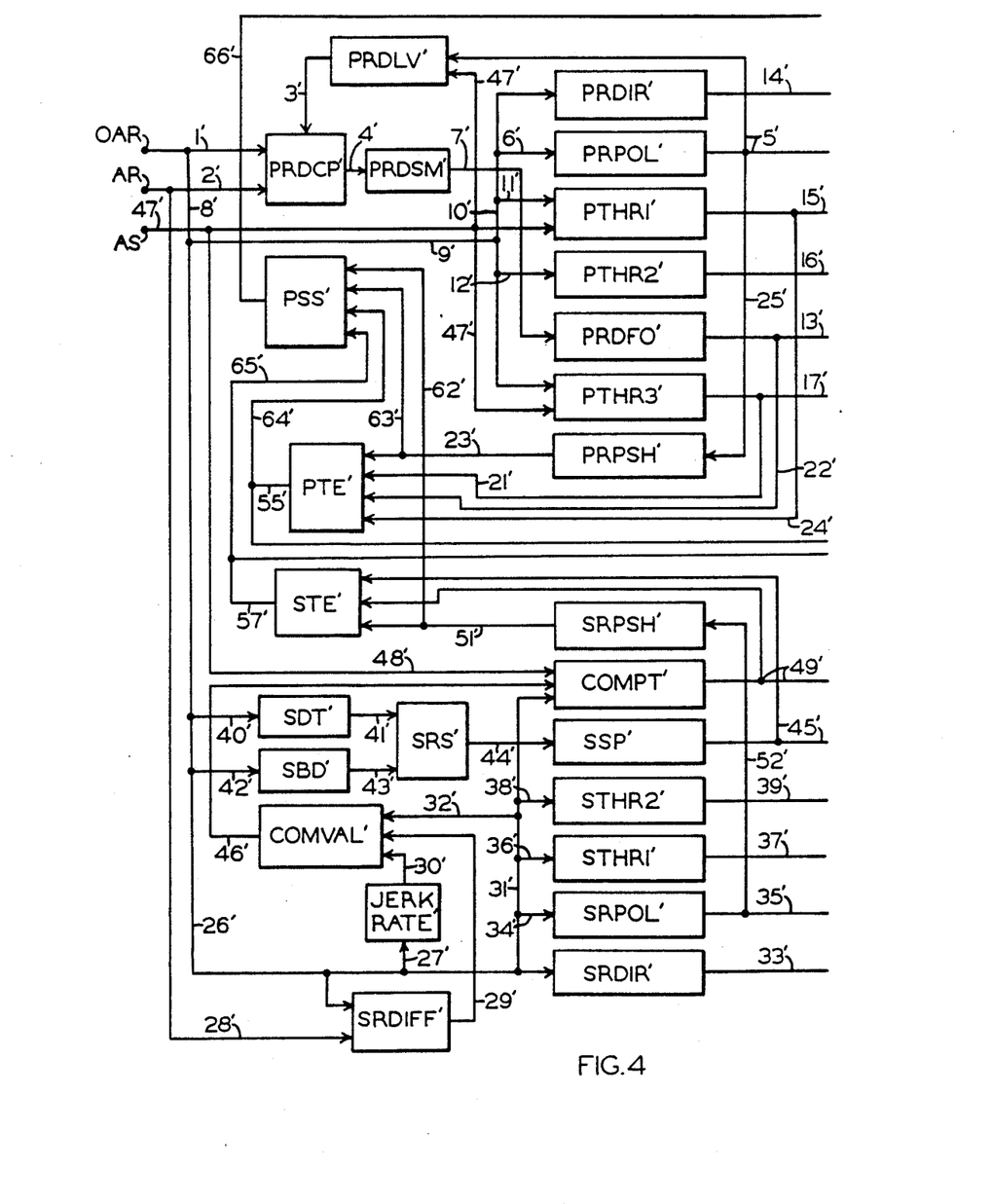
Figure 5:
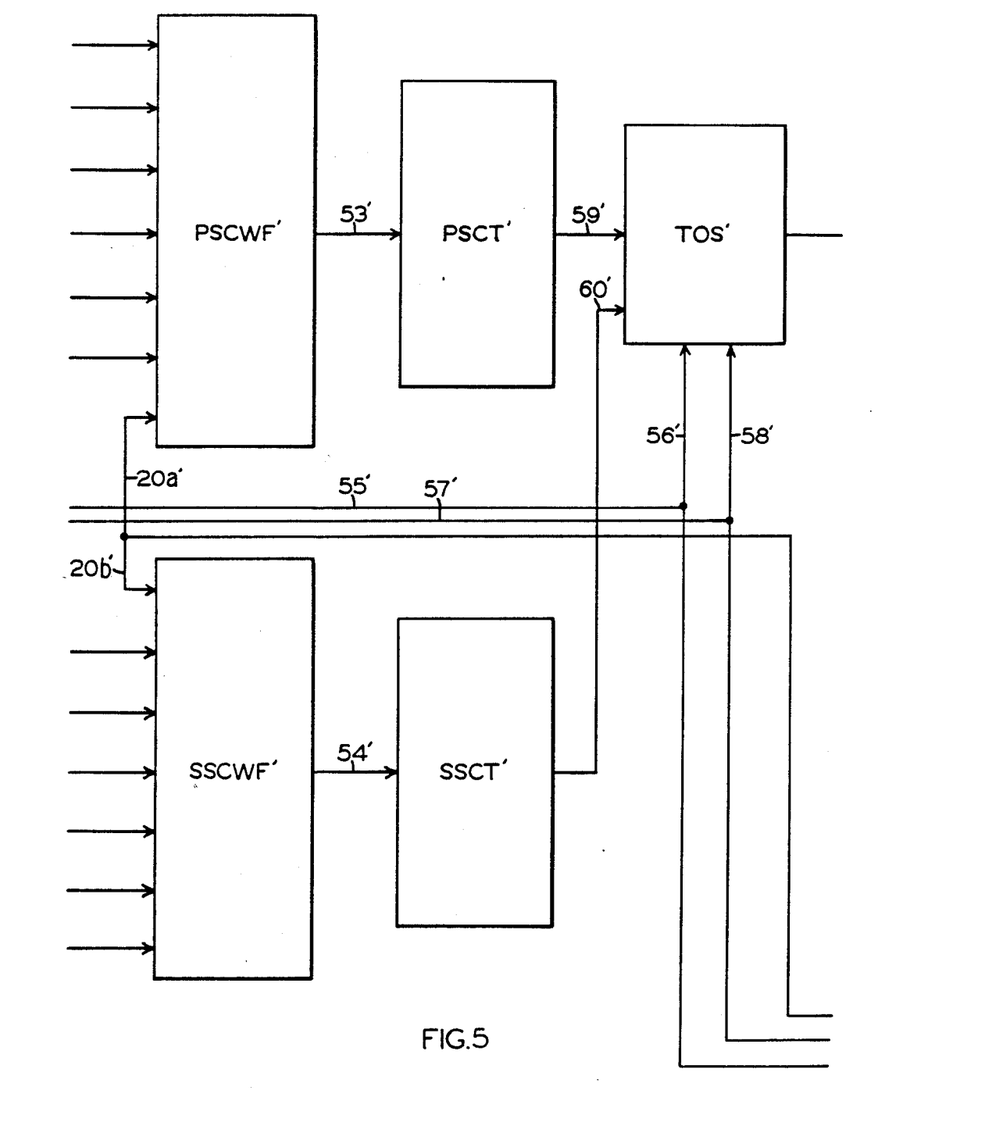
Figure 6:
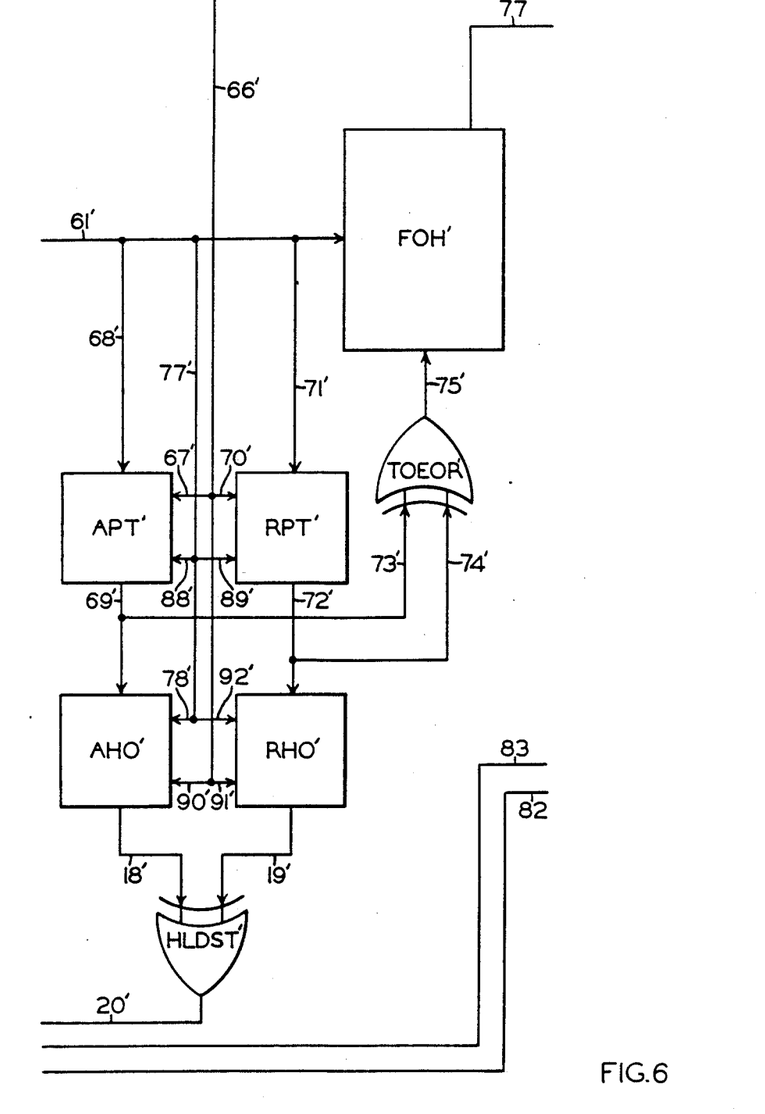

It will be appreciated that the schematic circuit block diagram illustrated by FIGS. 1, 2 and 3 is substantially the same as that illustrated by FIGS. 4, 5 and 6, and therefore, only the following brief description is included for convenience purposes. As shown in FIGS. 4, 5 and 6, the notations of all of the block diagrams and the lead lines with exception of terminals OAR, AR and AS and lead lines 77, 82 and 83 have been primed to distinguish from the elements of FIGS. 1, 2 and 3. In viewing FIG. 4, it will be seen that lead 8' is connected to terminal OAR and that lead 28' is connected to terminal AR. Further, it will be noted that the lead 77 is connected to the output of the force output held sensor FOH' as shown in FIG. 6. It will be observed that the input leads 82 and 83 are connected to the other axle primary table enable/disable circuit PTE' and the other axle synchronous table enable/disable circuit STE' via leads 55' and 57', respectively.

The following is a list of the valve state command possibilities and priority number for each of the valve state command possibilities:

| VALVE STATE | DEFINITION | PRIORITY |
|---|---|---|
| "APP" | Apply Brake Force | 6 |
| "REL" | Release Brake Force | 1 |
| "LAP" | Hold Present Brake Force Level | 4 |
| "APP PLS" | Apply Force For Time Period T1 Followed By LAP For Time T2. On Force Modulation Output It Is Read As Apply Brake Force. | 5 |
| "REL PLS" | Release Force For Time Period T3 Followed By LAP For Time T4. On Force Modulation Output It is Read As Release Brake Force. | 2 |
| "BF Hold" | On Force Modulation Output It Is Read As Lap, To Logic It Is Read As All Other Logic Input Changes Are Ignored Until Pulse Is Completed. | 3 |

Accordingly, the brake valve MBV is effectively controlled via lead 87 to provide efficacious braking of the wheels of the vehicle without experiencing lockup and slide between the contact of the wheel with the rail.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed.

It will be understood that variations, modifications, equivalents and substitutions for components of the above specifically-described embodiment of the invention may be made by those skilled in the art without departing from the spirit and scope of the invention as set forth in the appended claims.

We claim:

1. An electronic slip control system for a multiple-truck railway vehicle comprising, a standard slip control logic means responsive to axle speed and rate signals to produce a multi-bit binary number word, a primary slip control word formation means for converting the multi-bit binary number word to a hexidecimal number word which is conveyed to a primary slip control table means, said primary slip control table means conveys the hexidecimal number word to a table output selection means, a synchronous slip control logic means responsive to the axle speed and rate signals to produce a multi-bit binary word, a synchronous slip control word formation means for converting the multi-bit binary number word to a hexidecimal number word which is conveyed to a synchronous slip control table means, said synchronous slip control table means conveys the hexidecimal number word to said table output selection means which is connected to intermediate circuit means, and said intermediate circuit means causes an appropriate control signal to be conveyed to a brake valve for preventing wheel slip.

2. The electronic slip control system, as defined in claim 1, wherein said standard slip control logic means includes a primary rate detection logic sensor which determines when the rate is increasing, as well as when the rate is decreasing.

3. The electronic slip control system, as defined in claim 1, wherein said standard slip control logic means is a primary rate polarity logic sensor which indicates when the axle rate on a given axle is at a positive polarity.

4. The electronic slip control system, as defined in claim 1, wherein said standard slip control logic means includes a first primary threshold logic sensor which determines when the axle rate is greater than and equal to a set point.

5. The electronic slip control system, as defined in claim 4, wherein said standard slip control logic means includes a secondary primary threshold logic sensor which determines when the axle rate is greater than and equal to a positive rate set point.

6. The electronic slip control system, as defined in claim 3, wherein said standard slip control logic means includes a primary rate difference detection level logic sensor which determines the rate difference detection level based on axle of said primary rate polarity logic sensor.

7. The electronic slip control system, as defined in claim 1, wherein said standard slip control logic means includes a primary rate difference comparison logic sensor which compares one axle rate to the other axle rate on the truck.

8. The electronic slip control system, as defined in claim 7, wherein said standard slip control logic means includes a primary rate difference summing logic sensor which receives a sole input from said primary rate difference comparison logic sensor.

9. The electronic slip control system, as defined in claim 8, wherein said standard slip control logic means includes a primary rate difference final output sensor which receives a sole input from said primary rate difference summing logic sensor.

10. The electronic slip control system, as defined in claim 3, wherein said standard slip control logic means includes a primary rate polarity shift logic sensor which generates a signal for one program cycle whenever said primary rate polarity logic sensor changes from a positive axle rate to a negative axle rate.

11. The electronic slip control system, as defined in claim 5, wherein said standard slip control logic means includes a third primary threshold logic sensor which determines when the axle rate is less than and equal to a negative rate set point.

12. The electronic slip control system, as defined in claim 1, wherein a hold state logic sensor conveys a release and an application brake force pulse to said primary slip control table means.

13. The electronic slip control system, as defined in claim 1, wherein said standard slip control logic means includes a primary table enable/disable circuit which enables and disables said primary slip control table means.

14. The electronic slip control system, as defined in claim 1, wherein said synchronous slip control logic means includes a synchronous rate direction logic sensor which determines when the rate is increasing and when the rate is decreasing.

15. The electronic slip control system, as defined in claim 1, wherein said synchronous slip control logic means includes a synchronous rate polarity logic sensor which indicates when a given axle rate is at a positive polarity.

16. The electronic slip control system, as defined in claim 1, wherein said synchronous slip control logic means includes a first synchronous threshold logic sensor which indicates when the axle rate is less than the maximum vehicle request rate.

17. The electronic slip control system, as defined in claim 16, wherein said synchronous slip control logic means includes a second synchronous threshold logic sensor which determines when the axle rate is greater than and equal to a positive rate set point.

18. The electronic slip control system, as defined in claim 1, wherein a synchronous determination sensor receives a sole input from the axle rate.

19. The electronic slip control system, as defined in claim 18, wherein a synchronous slip control logic means includes a synchronous band detector sensor which receives a sole input from the axle rate.

20. The electronic slip control system, as defined in claim 19, wherein said synchronous slip control logic means includes a synchronous rate summation logic sensor which receives one input from said synchronous determination sensor and another input from said synchronous band detector sensor.

21. The electronic slip control system, as defined in claim 20, wherein said synchronous slip control logic means includes a synchronous set point logic sensor which receives a sole input from said synchronous rate summation logic sensor.

22. The electronic slip control system, as defined in claim 1, wherein said synchronous slip control logic means includes a synchronous rate difference sensor which subtracts the axle rate of one axle from the axle rate of the other axle.

23. The electronic slip control system, as defined in claim 22, wherein a jerk rate signal is derived by periodically taking the difference between the previous axle rate and the present axle rate.

24. The electronic slip control system, as defined in claim 23, wherein said synchronous slip control logic means includes a combined value signal which is a summation of the absolute value of the axle rate, the absolute value of the jerk rate signal, and the absolute value of the output of said synchronous rate difference sensor.

25. The electronic slip control system, as defined in claim 24, wherein said synchronous slip control logic means includes a third threshold detection logic sensor which determines if the axle rate is greater than or equal to a set point established by said combined value sensor.

26. The electronic slip control system, as defined in claim 12, wherein said hold state logic sensor conveys a release and an application brake force pulse to said synchronous slip control table means.

27. The electronic slip control system, as defined in claim 13, wherein said synchronous slip control logic means includes a synchronous table enable/disable circuit which enables and disables said synchronous slip control table means.

28. The electronic slip control system, as defined in claim 14, wherein said synchronous slip control logic means includes synchronous rate polarity shift logic sensor which generates a signal for one program cycle whenever said synchronous rate polarity logic sensor changes from a positive axle rate to a negative axle rate.

29. The electronic slip control system, as defined in claim 27, wherein the four-input polarity shift selector is connected to said primary table enable/disable circuit, to said synchronous table enable/disable circuit, to said primary rate polarity shift sensor and to said synchronous rate polarity shift sensor.

30. The electronic slip control system, as defined in claim 29, wherein a table output selector is connected to said primary table enable/disable circuit, to said synchronous table enable/disable circuit, to said primary slip control table means and to said synchronous slip control table means.

31. The electronic slip control system, as defined in claim 30, wherein an application pulse timer and a release pulse timer read the output word from the table output selector.

32. The electronic slip control system, as defined in claim 31, wherein a timer output exclusive "OR" gate is connected to said applicant pulse timer and said release pulse timer.

33. The electronic slip control system, as defined in claim 32, wherein a force output hold sensor is connected to said timer output exclusive "OR" gate.

34. The electronic slip control system, as defined in claim 31, wherein an application hold one-shot sensor and a release hold one-shot sensor is connected to said application pulse timer and said release pulse timer.

35. The electronic slip control system, as defined in claim 33, wherein an axle-sensing and truck control interface circuit is connected to said force output hold sensor.

36. The electronic slip control system, as defined in claim 35, wherein a safety timer interface circuit is connected to said axle-sensing and truck control interface circuit for controlling a magnetic valve driver circuit which is connected to a magnetic brake valve for controlling the brakes on the truck of the vehicle.

* * * * *

UNITED STATES PATENT AND TRADEMARK OFFICE
CERTIFICATE OF CORRECTION

PATENT NO. : 4,941,099
DATED : July 10, 1990
INVENTOR(S) : James A. Wood and Richard J. Mazur It is certified that error appears in the above-identified patent and that said Letters Patent is hereby corrected as shown below:

Column 17, line 30, delete "secondary" and insert --second-- line 37, after "axle" insert --rate--

Column 19, line 13, delete "the" and insert --a--

Signed and Sealed this

Seventeenth Day of September, 1991

Attest:

HARRY F. MANBECK, JR.

Attesting Officer

Commissioner of Patents and Trademarks